United States Patent [19]

Gueret

[11] Patent Number: 5,269,991

[45] Date of Patent: Dec. 14, 1993

[54] PROCESS FOR OBTAINING MOULDINGS WITH THE APPEARANCE OF NATURAL STONES

[75] Inventor: Jean-Louis Gueret, Paris, France

[73] Assignee: L'Oreal, Paris, France

[21] Appl. No.: 972,729

[22] Filed: Nov. 6, 1992

Related U.S. Application Data

[63] Continuation of Ser. No. 638,989, Jan. 10, 1991, abandoned.

[30] Foreign Application Priority Data

Jan. 17, 1990 [FR] France .................. 90 00476

[51] Int. Cl.⁵ .............. B29C 45/16; B29C 45/46
[52] U.S. Cl. ........................ 264/73; 264/40.6; 264/75; 264/78; 264/122; 264/245; 264/328.18; 428/15
[58] Field of Search ............ 264/73, 75, 122, 245, 264/109, 328.17, 328.18, 78, 134, 40.6; 428/15; 523/171

[56] References Cited

U.S. PATENT DOCUMENTS

| | | | |
|---|---|---|---|
| 3,388,196 | 6/1968 | Farrell | 264/75 |
| 3,706,825 | 12/1972 | Hall et al. | 264/171 |
| 3,773,886 | 11/1973 | Starr et al. | 264/245 |
| 3,814,790 | 6/1974 | Kato et al. | 264/122 |
| 3,906,065 | 9/1975 | Schneider et al. | 264/245 |
| 4,128,689 | 12/1978 | Heaps et al. | 264/75 |
| 4,137,215 | 1/1976 | Van Gasse | 264/77 |
| 4,544,584 | 10/1985 | Ross et al. | 264/77 |
| 4,643,921 | 2/1987 | Terabe et al. | 428/15 |
| 4,795,603 | 1/1989 | Nagayasu | 264/331.18 |
| 5,112,657 | 5/1992 | Melber | 428/15 |

FOREIGN PATENT DOCUMENTS

| | | | |
|---|---|---|---|
| 385202 | 1/1932 | Belgium . | |
| 898289 | 11/1983 | Belgium . | |
| 438339 | 7/1991 | European Pat. Off. | 264/331.17 |
| 3445189 | 12/1983 | Fed. Rep. of Germany . | |
| 2413205 | 12/1977 | France . | |
| 46-9680 | 3/1971 | Japan | 264/318.18 |

OTHER PUBLICATIONS

Chemical Abstracts, vol. 110, No. 8, Columbus, Ohio, USA ref. No. 62710E & JP-A-63207610 (Kohjin Co.) Aug. 29, 1988.

*Primary Examiner*—Jan H. Silbaugh
*Assistant Examiner*—Mathieu Vargot
*Attorney, Agent, or Firm*—Cushman, Darby & Cushman

[57] ABSTRACT

A process for manufacturing mouldings with the appearance of natural stones from a composition including a coloured or colourless thermoplastic resin matrix and, per 100 parts by volume of this matrix, 0.2 to 80 parts by volume of at least two fillers chosen from natural fibres, carbon fibres and mineral fillers having a different grain size or dimensions. By chosing the color of the matrix and the number, proportion, grain size and color of the different fillers, the general appearance and colors of a natural stone may be imitated. The mouldings obtained after working may be used due to their aesthetic appearance, particularly as packaging for cosmetic products.

16 Claims, No Drawings

PROCESS FOR OBTAINING MOULDINGS WITH THE APPEARANCE OF NATURAL STONES

This is a continuation of application Ser. No. 07/638,989, filed on Jan. 10, 1991, which was abandoned upon the filling hereof.

FIELD OF THE INVENTION

The present invention relates to a process for obtaining mouldings with the appearance of natural stones intended, in particular, for the packaging of cosmetic products, as well as to the mouldings with the appearance of natural stones thus obtained.

BACKGROUND OF THE INVENTION

In order to produce injection mouldings of different shapes and sizes, the use of a mixture of polypropylene and sawdust prepared before injection is known, the proportion of sawdust being generally between 10 and 50% by weight.

Heat-moulding of a material of this type can be done in all conventional injection devices designed for moulding thermoplastic materials. The sawdust and polypropylene mixture may be introduced into the cylinder (or cylinders) or heated chamber (or chambers) of a standard injection machine where the thermoplastic resin is softened; a compression organ, such as a piston or endless screw, then injects the mixture of melted thermoplastic resin and sawdust, through an injection head at the end of the cylinder, into a mould.

The temperature of the front part of the cylinder is usually set to about 160° C. and that of the rear part to about 180° C., these values may vary within a range of +/−15° C. depending on the shape and size of the moulding to be made, the quantity of material required and other moulding parameters such as the injection pressure, the proportion of sawdust in the mixture, etc. Thus, for a set moulding to be made, there is a temperature $t_1$ for the rear part of the cylinder of the injection machine and a temperature $t_2$ for the front part of the said cylinder—$t_1$ being lower than $t_2$—which corresponds to an optimum injection moulding operation, giving the moulding a uniform appearance and the physical characteristics usually achieved with this type of material. Moreover, it is also known that the material injected into the mould must never exceed a temperature of 210° C. which corresponds to a threshold of decomposition of the wood. If this temperature is reached or exceeded, the material thus heated is degassed and expands so that the moulding obtained is totally unusable.

In French Patent 2 413 205, it has already been stated that by increasing the optimum temperatures at the front and rear parts of the injection machine chamber by a value $\Delta t$ within 5° and 15° C. without exceeding the threshold of 210° C. of decomposition of the wood, a moulding of a darker colour is obtained, the wall of which has marbling giving it the appearance of wood. This decorative feature is obtained without distorting the moulding in any way and is perfectly reproduceable. It is assumed that the increase in the optimum temperatures at the front and rear parts of the chamber transforms the sawdust contained in the mixture but the heating temperatures are insufficient to cause decomposition, degassing and expansion of the injected material. Mouldings with the appearance of wood are thus obtained.

Moreover, Patent JP-A 63207610 describes the manufacture of a product with the appearance of marble by preparing a pre-impregnated sheet containing fibres and a mineral filler and a thermohardenable resin by laminating the impregnated sheet and heat-hardening it. Belgian Patent BE-A 385 202 concerns a process for manufacturing artificial sandstone in which a thermohardenable resin in a dry state or in solution with fibrous materials is mixed and the mixture compressed in heated moulds under high pressure.

SUMMARY OF THE INVENTION

Whilst seeking new aesthetic effects for mouldings obtained by working a plastic material by injection, moulding, rotational moulding or extrusion, the Applicant has discovered that by using a mixture of melted thermoplatic material containing at least two fillers of different grain size and dimensions and by an appropriate choice of the nature of these fillers and the nature of the thermoplastic matrix of the mixture to be molded, of their proportions and colours, the grain size or dimension of the fillers, it is possible to obtain, with good reproduceability, mouldings which imitate a given natural stone, the surface of which, to a surprising extent, does not give the impression of a moulding made of plastic and in which the colour and appearance of marbling, flecks or suchlike, are in the mass and not on the surface. These mouldings are used for their aesthetic appearance; they are in particular intended for the manufacture of packaging or packaging accessories for cosmetic products such as caps, stoppers, cases and suchlike.

DETAILED DESCRIPTION OF THE INVENTION

The present invention therefore relates to a process for manufacturing mouldings with the appearance of natural stones, by molding a composition comprising a thermoplastic resin matrix and a filler, the moulding being preceded by at least one stage during which the said composition in the molten state is subjected, as a whole or for at least one of its parts containing at least one fraction of the thermoplastic resin, to at least one mixing operation, characterised in that the composition is made up of, per 100 parts by volume of coloured or colourless thermoplastic resin, 0.2 to 80 parts by volume of at least two coloured or colourless fillers, selected from natural fibres, carbon fibres, and other mineral or vegetable fillers and having a different grain size or dimensions.

Preferably three fillers of different grain sizes are used; the filler of the finest grain size is preferably a mineral filler and the other two fillers are natural fibres. In the latter case, for example, if talc is used as a mineral filler, together with natural dyed or undyed fibres, comprising wood dust measuring between 200 and 300 microns and wood fibres of a larger size, a moulding is obtained in which the mineral filler forms a background flecked with wood dust, the surface of the moulding being enhanced by the larger-sized wood fibres.

The matrix may be any thermoplastic resin, namely any polymer, copolymer or mixture of polymers and/or copolymers. For example, an acrylic resin, a polyvinyl chloride, a nylon, of linear polyethylene, polystyrene and polypropylene or an acrilonitrile-butadiene-styrene copolymer may be used. These thermoplastic resins may be modified in a known way by introducing 0.1 to 30% by weight of an elastomer such as the copolymer of ethylene and vinyl acetate (EVA) or a tripolymer of ethylene, propylene and diene monomer (EPDM). The thermoplastic polymers or copolymers and, if necessary, the elastomer may be introduced in the form of white, colourless, or dyed (ochre, blue, grey, brown, green, etc.) granules. Dyed polypropylene granules, for example, such as are commercially available may be used.

In regard to fibres, preferably natural fibres which are resistant to the melting point of the thermoplastic matrix are used, namely to a temperature of the order of 200° C. Natural fibres are advantageously selected from wood fibres (wood dust, sawdust), liana fibres and cotton fibres. The natural fibres used, according to the invention, are advantageously of a diameter of between 0.7 and 300 microns and between 1 micron and 5 mm long. If necessary, when black fibres are required, carbon fibres may be used. Preferably, these fibres are between 100 microns and 3 mm long. If a filler comprising fibres of different sizes is used, the smaller fibres are advantageously between 1 micron and 1.9 mm long and the larger fibres between 2 mm and 5 mm long.

In regard to fillers, mineral charges may be used such as calcium carbonate, calcium sulphate, zinc oxide, zinc carbonate, magnesium oxide, hydroxide or silicate, for example talc, silico-aluminates, such as mica, sienna, clays or glass microballs. If necessary, vegetable fillers may also be used, in particular starches such as corn starch or rice flour. The filler (or fillers) used has (have) a grain size which ranges, for example, from about 0.5 micron to about 0.2 mm. Mineral fillers and, more particularly, microballs, have the advantage of making the plastic material rigid.

Charges in the form of a premixture with a thermoplastic polymer compatible with the thermoplastic resin of the matrix, preferably identical to the latter, may be advantageously introduced into the matrix. In this case the premixture may also contain from 0.5 to 80 parts by volume of filler(s) per 100 parts by volume of thermoplastic polymer. The fibres or fillers introduced may be coloured or colourless. The fillers may be dyed by impregnation using a liquid dye, particularly a water-soluble one, or by mixing with a powder dye or pigment. Clearly, the dye selected is one which is resistant to the melting point of the matrix. Dyeing may be done at the same time as premixing. In which case, the thermoplastic polymer of the premixture is preferably of the same colour, but not necessarily the same shade as the filler.

The Applicant has observed that, when a coloured filler is introduced into the coloured or colourless thermoplastic matrix, the colour of the filler does not vary and does not change the colour of the matrix; in other words, there is no colour take-up by the matrix on processing, for example on moulding. This is so whether the matrix is transparent, white or coloured. Similarly, when a colourless filler is incorporated into a coloured matrix, the filler does not take on the colour of the matrix. By contrast, if a premixture, of which the thermoplastic polymer is coloured or white, is introduced into the matrix, the polymer changes the colour or shade of the thermoplastic matrix. These observations enable the appearance of the artificial stone obtained to be predicted, on the basis of the composition used.

Consequently, according to the present Application, by selecting the colour of the matrix, the number, the proportion, the grain size and the colour of the different fillers and taking into account the above-mentioned observations, the general appearance and colours of various natural stones may be imitated. It should be noted that, if desired, a homogeneous distribution of the various fillers in the matrix may be obtained in a reproduceable way.

For the manufacture of mouldings, a mixture of the various fillers as they are or in the form of a premixture(s), particularly in granules with the thermoplastic resin(s), is prepared, the mixture is melted and the molten product is subjected to a more or less through mixing, depending on the desired appearance of the moulding (marbled or homogeneous). The product is then moulded according to a well known thermoplastic resin moulding process: extrusion, injection moulding, blow moulding, compression moulding or rotational moulding. The shape of the moulding obtained may be modified later mechanically. Moulding may advantageously be performed in a conventional injection moulding device comprising at least one heated chamber containing a moving compression organ, the heated chamber opening into at least one injection head inside a mould; the compression organ is selected on the basis of the degree of mixing that it can impart to the moulding composition inside the chamber, with the aim of achieving an effect ranging from regular flecking by thorough mixing to marbling by simply pushing the material into the heated chamber, without mixing the said material in any way.

According to this procedure, moulding is best performed by bringing, using the appropriate heating organs, the rear part of the chamber where the mixture is introduced, to a temperature $t_1$, and the front part of the chamber, where the mixture is injected into the mould, to a temperature $t_2$, the said two temperatures corresponding to the optimum moulding temperatures for a given moulding to be made and being for example $t_1 < t_2 < 210°$ C. In particular, $t_1$ may vary from 170° to 200° C. and $t_2$ from 180° to 210° C.

The present invention also relates to mouldings with the appearance of natural stones, intended particularly for packaging for cosmetic products and obtained by implementing the process described below.

To enable a better understanding of the present invention we shall now describe, by way of examples which are purely illustrative and in no way limiting, several methods of implementation.

In these examples, the parts and percentages are given by volume. The polypropylene granules used, coloured and/or with added fillers if necessary, are of a size of the order of 0.5 to 7 mm; they are sold by the "HIMONT" Company under the name "MOPLEN". The wood fibres contained in the granules, described as long, are of a size of the order of 2 to 5 mm, and those described as short are of a size of the order of 1 micron to 1.9 mm.

When the fibres or pigments incorporate a water-soluble dye, the said dye is set on its support by soaking the support continuously for 1 to 15 min in an aqueous solution of 5 to 30% by weight of the said dye.

EXAMPLE 1

The following formulation is prepared:

| | |
|---|---|
| White polypropylene granules | 10 parts |
| Light blue polypropylene granules containing 40% short wood fibres dyed a darker blue | 1 part |
| Light green polypropylene granules containing 40% long wood fibres dyed a darker green | 1 part |
| Light beige polypropylene granules containing | 3 parts |

-continued

| |
|---|
| 40% short wood fibres dyed a darker beige |

The mixture of polypropylene granules and wood fibres with the above composition is introduced into the chamber of an endless screw machine. The temperature at the rear part of the chamber where the mixture is introduced is set to 190° C. and the temperature at the front part of the chamber where the mixture is injected into the mould to 200° C. The mixture, softened inside the heated chamber, is injected under high pressure through an injection head into a mould; compression and injection of the mixture is achieved by a rotary endless screw.

A moulding is obtained with the appearance of a stone, the colour of which has a greenish background flecked with small blue, green and beige speaks.

EXAMPLE 2

The same formulation is prepared as in Example 1 and, for the moulding, the procedure is as described in Example 1, except that an injection machine is used with a piston which, unlike the endless screw, does not thoroughly mix the mass to be moulded. Under these conditions, a moulding is obtained with the appearance of marble having, on a greenish background, beige and green lines, as well as a flecking of small specks, also beige and green.

EXAMPLE 3

The following formulation is prepared:

| | |
|---|---|
| White polypropylene granules with 50% calcium carbonate filler | 18 parts |
| Transparent polypropylene granules containing 40% long natural wood fibres | 5 parts |
| Red pigments resulting from mixing calcium carbonate with a concentrated aqueous solution of the water-soluble dye "eosin" mixed with colourless polypropylene | 20 parts |
| Blue pigments resulting from mixing calcium carbonate with a concentrated aqueous solution of the water-soluble dye "methylene blue" mixed with polypropylene | 20 parts |
| Green pigments resulting from mixing calcium carbonate with a concentrated aqueous solution of the water-soluble dye "malachite green" mixed with colourless polypropylene | 20 parts |

For moulding, the procedure is as described in Example 1, the moulding obtained having the appearance of a stone, the colour of which comprises a white background with a scattering of small blue, red and green specks and natural wood.

EXAMPLE 4

The following formulation is prepared:

| | |
|---|---|
| Beige polypropylene granules containing 40% short wood fibres dyed a darker beige | 4 parts |
| Transparent polypropylene granules containing 40% long natural wood fibres | 4 parts |
| White polypropylene granules with 50% calcium carbonate filler | 2 parts |

For moulding, the procedure is as described in Example 1, the moulding obtained having the appearance of a stone, the colour of which comprises a light beige background with an underlying "dappling" due to the short fibres and an overlying "dappling" resulting from the long fibres.

EXAMPLE 5

The following formulation is prepared:

| | |
|---|---|
| White polypropylene granules with 20% calcium carbonate filler | 18 parts |
| Sawdust (size: 1.2 mm) | 1 part |

For moulding, the procedure is as described in Example 1, the moulding obtained having the appearance of a stone, the colour of which comprises a white background flecked with small specks interspersed with light brown resulting from the sawdust.

EXAMPLE 6

The same formulation as described in Example 5 is prepared, replacing the sawdust with transparent polypropylene granules containing 40% sawdust. From this mixture a moulding is obtained with an appearance which is approximately identical to that obtained in Example 5.

EXAMPLE 7

The following formulation is prepared:

| | |
|---|---|
| White polypropylene granules without filler | 10 parts |
| Light beige polypropylene granules, containing 40% short wood fibres dyes a darker beige | 1 part |
| Ochre polypropylene granules containing 40% long wood fibres dyed a darker ochre | 1 part |

For moulding, the procedure is as described in Example 1, the moulding obtained having the appearance of a stone, the colour of which comprises a very light beige background flecked with brown, ochre and dark beige specks of an irregular size.

EXAMPLE 8

The following formulation is prepared:

| | |
|---|---|
| White polypropylene granules | 10 parts |
| Blue polypropylene granules with 60% long wood fibres filler dyed blue | 1 part |
| Light beige polypropylene granules containing 40% short wood fibres dyed light beige | 2 parts |
| Light ochre polypropylene granules containing 40% short wood fibres dyed light ochre | 2 parts |
| Green polypropylene granules with 45% short wood fibres dyed green | 0.5 part |
| Blue pigments resulting from mixing 20% talc with a concentrated aqueous solution of the water-soluble dye "methylene blue" | 0.05 part |

For moulding, the procedure is as described in Example 1, the moulding obtained having the appearance of a stone, the colour of which comprises a blue grey background sprinkled with beige, blue, ochre and green dots and specks.

EXAMPLE 9

The following formulation is prepared:

| | |
|---|---|
| White ABS granules containing 50% calcium carbonate | 30 parts |
| EVA granules containing 40% short natural wood fibres | 5 parts |

| -continued | |
|---|---|
| Polypropylene granules containing 20% long wood fibres, dyed pink | 30 parts |
| Polypropylene granules containing 40% long wood fibres, dyed brown | 35 parts |

The combination of the above granules is mixed in a cold rotary drum. The mixture is then introduced, using a loading funnel, into a screw chamber in which the temperature at the rear part is 170° C. and the temperature at the front part is 200° C. The chamber supplies a mould by extrusion; the moulded product obtained is a moulding with a white matt background dappled in beige sprinkled with beige and brown specks.

EXAMPLE 10

The following formulation is prepared:

| | |
|---|---|
| Beige polypropylene granules | 55 parts |
| Beige polypropylene granules containing 40% calcium carbonate | 29 parts |
| Short natural wood fibres | 3 parts |
| Long natural wood fibres dyed pink | 0 part |
| Long natural wood fibres dyed brown | 6 parts |
| Clear paraffin oil | 1 part |

For moulding, the procedure is as described in Example 9. The moulding obtained has a mottled matt beige background with brown and pink particles on the surface.

I claim:

1. A process for manufacturing moldings with the appearance of natural stones, by molding a composition comprising a thermoplastic resin matrix and fillers, said molding being preceded by at least one stage during which said composition, while in the molten state, is subjected, with at least one of its parts containing at least one fraction of the thermoplastic resin, to at least one mixing operation, said composition being made up of, per 100 parts by volume of thermoplastic resin, 0.2 to 80 parts by volume of a combination at least three fillers one of which is a mineral filler and the other two are natural fiber fillers and having varying grain sizes, said mineral filler having the finest grain size of the three fillers;
   said process further including the steps of using an injection molding device to carry out the molding step, the molding device having a heated chamber having an opening into an injection head connected to a mold and a compression means for effecting selective mixing inside said chamber ranging from thorough mixing to substantial absence of mixing,
   said process further including the steps of using heat control means to heat the rear part of said heated chamber where the composition is introduced to a first temperature and the front part of said chamber where the injection head is located to a second temperature that is greater than said first temperature but less than 220° C.

2. A process according to claim 1, wherein said thermoplastic resin matrix is selected from the group consisting of an acrylic resin, a vinyl chloride, a nylon, a linear polyethylene, polystyrene, polypropylene, or an acrylonitrile-butadiene-styrene copolymer.

3. A process according to claim 2, wherein the matrix is modified by the introduction of 0.1 to 30% by weight of an elastomer.

4. A process according to claim 1, wherein said natural fibres are resistant to breakdown up to a temperature of the order of 200° C.

5. The process as claimed in claim 4, wherein the natural fibers comprise cellulose fibers.

6. A process according to claim 4 wherein said natural fibres used are of a uniform size between 0.7 and 300 microns in diameter and between 1 micron and 5 mm long.

7. A process according to claim 1, wherein said fibers are provided in two groups with one group having a size between 1 micron and 1.9 mm long and the other group being between 2 mm and 5 mm long.

8. A process according to claim 4 wherein said natural fibres are fibres between 100 microns and 3 mm long.

9. A process according to claim 1 wherein said mineral fillers are selected from the group consisting of calcium carbonate, calcium sulphate, zinc oxide, zinc carbonate, magnesium oxide, magnesium hydroxide, magnesium silicate, silico-aluminates and glass balls.

10. A process according to claim 1 wherein a starch is also chosen as a filler.

11. A process according to claim 9, wherein mineral fillers are used which have a grain size ranging from about 0.5 microns to about 0.2 mm.

12. A process according to claim 11 wherein the mineral fillers are introduced into the matrix in the form of a premixture with a thermoplastic polymer compatible with the thermoplastic resin of the matrix.

13. A process according to claim 12, wherein the premixture contains from 0.5 to 80 parts by volume of mineral fillers per 100 parts by volume of thermoplastic polymer.

14. A process according to claim 1 wherein said fillers are dyed by impregnation using a liquid dye.

15. The invention as claimed in claim 1 wherein said first temperature is from 170° C. to 200° C. and said second temperature is from 180° C. to 210° C.

16. A process as claimed in claim 13, wherein the fillers are dyed by mixing with a powder dye.

* * * * *